United States Patent
Cloeter et al.

(10) Patent No.: US 9,545,606 B2
(45) Date of Patent: Jan. 17, 2017

(54) SOLUBILIZING SURFACTANTS INTO SUPERCRITICAL CARBON DIOXIDE FOR ENHANCED OIL RECOVERY

(75) Inventors: Michael D. Cloeter, Lake Jackson, TX (US); Raymond M. Jones, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 593 days.

(21) Appl. No.: 13/701,575

(22) PCT Filed: Jun. 3, 2011

(86) PCT No.: PCT/US2011/001006
§ 371 (c)(1),
(2), (4) Date: Dec. 3, 2012

(87) PCT Pub. No.: WO2011/152876
PCT Pub. Date: Dec. 8, 2011

(65) Prior Publication Data
US 2013/0074943 A1 Mar. 28, 2013
US 2013/0240046 A9 Sep. 19, 2013

Related U.S. Application Data

(60) Provisional application No. 61/351,510, filed on Jun. 4, 2010.

(51) Int. Cl.
*B01F 5/04* (2006.01)
*C09K 8/594* (2006.01)
*E21B 43/16* (2006.01)

(52) U.S. Cl.
CPC .......... *B01F 5/0451* (2013.01); *B01F 5/0463* (2013.01); *B01F 5/0466* (2013.01); *C09K 8/594* (2013.01);
(Continued)

(58) Field of Classification Search
None
See application file for complete search history.

(56) References Cited

U.S. PATENT DOCUMENTS 2,677,700 A  5/1954 Jackson et al.
2,983,763 A  5/1961 Krause
(Continued)

FOREIGN PATENT DOCUMENTS

GB  2094863  9/1982
WO  2008115173  9/2008
(Continued)

OTHER PUBLICATIONS

International Search Report and Written Opinion from related PCT application PCT/US2011/001006 dated Sep. 2, 2011, 13 pages.
(Continued)

*Primary Examiner* — Jeffrey Washville
(74) *Attorney, Agent, or Firm* — Brooks, Cameron & Huebsch, PLLC

(57) ABSTRACT

Embodiments of the present disclosure include a process and a system for solubilizing a surfactant in supercritical carbon dioxide that include providing a turbulent flow of the supercritical carbon dioxide into which the surfactant solubilizes and injecting the surfactant into the turbulent flow of the supercritical carbon dioxide to achieve a Jet Mixing Number of 0.01 to 1.0. In one or more embodiments, a pump provides turbulent flow to supercritical carbon dioxide moving through at least a portion of piping, and an injector associated with the piping conveys the surfactant through surfaces defining a port in the injector to inject the surfactant into the turbulent flow of the supercritical carbon dioxide so as to achieve the Jet Mixing Number of 0.01 to 1.0.

13 Claims, 8 Drawing Sheets

(52) U.S. Cl.
CPC ...... *E21B 43/164* (2013.01); *B01F 2215/0409* (2013.01); *B01F 2215/0431* (2013.01); *B01F 2215/0459* (2013.01); *B01F 2215/0477* (2013.01); *B01F 2215/0481* (2013.01); *Y02P 20/544* (2015.11); *Y02P 90/70* (2015.11); *Y10T 137/0391* (2015.04); *Y10T 137/87652* (2015.04)

(56) References Cited

U.S. PATENT DOCUMENTS

| | | | |
|---|---|---|---|
| 3,332,442 | A | 7/1967 | Reed et al. |
| 4,029,879 | A | 6/1977 | Muzzio |
| 4,483,941 | A | 11/1984 | Yang |
| 4,627,495 | A | 12/1986 | Harris et al. |
| 4,931,225 | A | 6/1990 | Cheng |
| 5,033,547 | A | 7/1991 | Schievelbein |
| 5,105,843 | A * | 4/1992 | Condron ............ B01F 5/0405 137/13 |
| 5,789,505 | A * | 8/1998 | Wilkinson ............ C08F 2/04 427/421.1 |
| 6,333,019 | B1 | 12/2001 | Coppens |
| 6,686,438 | B1 | 2/2004 | Beckman et al. |
| 7,357,565 | B2 | 4/2008 | Gopolan et al. |
| 2010/0103769 | A1 * | 4/2010 | Bachman ............ B01F 3/0446 366/340 |

FOREIGN PATENT DOCUMENTS

| | | |
|---|---|---|
| WO | WO 2008/115173 A1 * | 9/2008 |
| WO | 2010044818 | 4/2010 |
| WO | 2011152876 | 12/2011 |

OTHER PUBLICATIONS

International Preliminary Report on Patentability from related PCT application PCT/US2011/001006 dated Sep. 7, 2012, 19 pages.

Ruivo, et al. "Hydrodynamics and mass transfer of a static mixer at high pressure conditions", Chemical Engineering and Processing, No. 45, 2006, 224-231.

Pietsch, et al. "The Mixer-settler principal as a separation unit in supercritical fluid processes", Journal of Supercritical Fluids, No. 14, 1999, 163-171.

Meterc, et al. "Drying of aqueous green tea extracts using a supercritical fluid spray process", Journal of Supercritical Fluids, No. 45, 2008, 253-259.

Xing, et al. "CO2-Soluble Surfactants for Improved Mobility Control" SPE129907, Society of Petroleum Engineers, 2010, 1-21.

* cited by examiner

SOLUBILIZING SURFACTANTS INTO SUPERCRITICAL CARBON DIOXIDE FOR ENHANCED OIL RECOVERY

This application is a National Stage application under 35 U.S.C. 371 of PCT/US2011/001006, filed on Jun. 3, 2011 and published as WO 2011/152876 A1 on Dec. 8, 2011, which claims the benefit of U.S. Provisional Application Ser. No. 61/351,510 filed Jun. 4, 2010, the entire contents of which are incorporated herein by reference in its entirety.

FIELD OF THE DISCLOSURE

The present disclosure generally relates to enhanced oil recovery and in particular to processes and systems for solubilizing surfactants into supercritical carbon dioxide for enhanced oil recovery.

BACKGROUND

A variety of techniques have been used for enhanced oil recovery (e.g., the recovery of hydrocarbons from oil containing reservoirs in which the hydrocarbons no longer flow by natural forces). Such techniques can include water injection and/or subsequent gas flooding, among others. Water injection can be useful to recover some hydrocarbons, however, only about a third of the hydrocarbons are recovered using this technique. As such, typically water injection procedures are followed by gas flooding procedures. Gas flooding can be performed with a miscible gas, which reduces the viscosity of oil present in the oil containing reservoir in order to increase the flow of hydrocarbons to a production well. Carbon dioxide, in a supercritical state, has been used as a miscible fluid to reduce the viscosity of the oil in the oil containing reservoirs. Supercritical carbon dioxide is one of the most effective and least expensive of the miscible fluids.

Gas flooding, however, can be accompanied with a number of drawbacks. One main problem encountered is poor sweep of the oil containing reservoir. Poor sweep occurs when the gas injected into the oil containing reservoir during a gas flooding process flows through the paths of least resistance due to the low viscosity of the gas, thus bypassing significant portions of the formation. When the gas bypasses significant portions of the formation, less oil is contacted with the gas, reducing the likelihood that the gas will reduce the viscosity of the oil producing poor sweep. In addition, due to the low density of the gas, the injected gas can rise to the top of the formation and "override" portions of the formation, leading to early breakthrough of the gas at the production well, leaving less gas within the oil containing reservoir to contact with the oil, again reducing the likelihood that the gas will reduce the viscosity of oil.

To enhance the gas flooding process effectiveness, it has been suggested that a surfactant be added to the supercritical carbon dioxide to generate an emulsion in the formation. An emulsion can generate an apparent viscosity of about 100 to about 1,000 times that of the injected gas, therefore, the emulsion can inhibit the flow of the gas into that portion of the oil containing reservoir that has previously been swept. In other words, the emulsion can serve to block the volumes of the oil containing reservoir through which the gas can short-cut, thereby reducing its tendency to channel through highly permeable fissures, cracks, or strata, and directing it toward previously unswept portions of the oil containing reservoir. As such, the emulsion can force the gas to drive the recoverable hydrocarbons from the less depleted portions of the reservoir toward the production well.

SUMMARY

Embodiments of the present disclosure include a process for solubilizing a surfactant in supercritical carbon dioxide that include providing a turbulent flow of the supercritical carbon dioxide into which the surfactant solubilizes and injecting the surfactant into the turbulent flow of the supercritical carbon dioxide to achieve a Jet Mixing Number of 0.01 to 1.0. A pump provides turbulent flow to supercritical carbon dioxide moving through at least a portion of piping, and an injector associated with the piping conveys the surfactant through surfaces defining a port in the injector to inject the surfactant into the turbulent flow of the supercritical carbon dioxide so as to achieve the Jet Mixing Number of 0.01 to 1.0.

In one or more embodiments, injecting the surfactant into the turbulent flow of the supercritical carbon dioxide produces a droplet diameter for the surfactant of less than a maximum stable droplet diameter calculated for a prevailing turbulent flow condition of the supercritical carbon dioxide. The present disclosure can also provide for producing droplet diameters of the surfactant that have a residence time in the supercritical carbon dioxide of less than 700 seconds. In one or more embodiments, the present disclosure provides for injecting the surfactant at a predetermined volumetric value relative a volumetric flow rate of the supercritical carbon dioxide. In one or more embodiments, the surfactant can be injected into the turbulent flow at an angle that is perpendicular to a longitudinal flow direction of the turbulent flow. Providing turbulent flow can include providing a fitting in the piping conveying the supercritical carbon dioxide and where injecting the surfactant into the turbulent flow of the supercritical carbon dioxide is adjacent the fitting. Providing turbulent flow can include providing a hollow conical insert in the piping conveying the supercritical carbon dioxide to increase a local velocity of the supercritical carbon dioxide near the injected surfactant.

In one or more embodiments, the present disclosure also include a system for solubilizing a surfactant in supercritical carbon dioxide that includes the supercritical carbon dioxide in piping; a pump to provide a turbulent flow of the supercritical carbon dioxide through at least a portion of the piping; and an injector associated with the piping, the injector conveying the surfactant through surfaces defining a port in the injector to inject the surfactant into the turbulent flow of the supercritical carbon dioxide so as to achieve a Jet Mixing Number of 0.01 to 1.0.

In one or more embodiments, the piping can include fittings and the injector associated with the piping is associated with the fittings of the piping. In one or more embodiments, the piping can includes a hollow conical insert in the piping to increase a local velocity of the supercritical carbon dioxide near the port. In one or more embodiments, the injector can be a tube that extends into the piping containing the supercritical carbon dioxide, the tube having the port in a position so the surfactant is injected into the supercritical carbon dioxide at an angle that is perpendicular to a longitudinal flow direction of the turbulent flow.

In one or more embodiments, the port in the injector allows the surfactant injected into the turbulent flow of the supercritical carbon dioxide to achieve a droplet diameter for the surfactant of less than a maximum stable droplet diameter calculated for a prevailing turbulent flow condition of the supercritical carbon dioxide. In one or more embodiments, the droplet diameter of the surfactant has a residence time in the supercritical carbon dioxide of less than 700 seconds. In one or more embodiments, the port in the injector is positioned approximately at a radial center of the piping. In one or more embodiments, the injector injects the surfactant at a predetermined volumetric value relative a volumetric flow rate of the supercritical carbon dioxide.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DEFINITIONS

Figure 1:
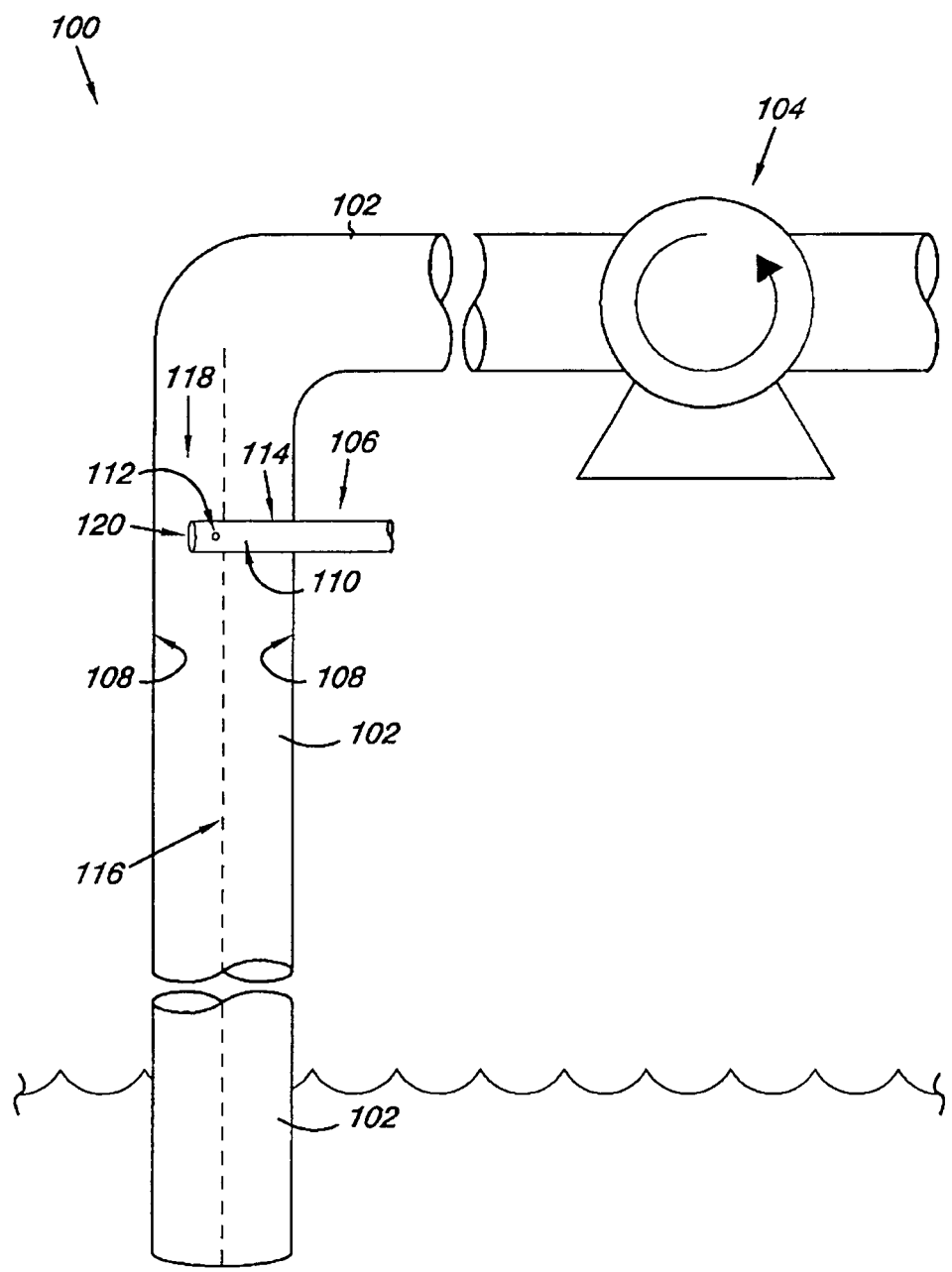
FIG. 1 illustrates one embodiment of a system for solubilizing a surfactant in supercritical carbon dioxide according to the present disclosure.

As used herein, the terms "a," "an," "the," "one or more," and "at least one" are used interchangeably and include plural referents unless the context clearly dictates otherwise.

Unless defined otherwise, all scientific and technical terms are understood to have the same meaning as commonly used in the art to which they pertain. For the purpose of the present disclosure, additional specific terms are defined throughout.

The terms "comprises," "includes" and variations of these words do not have a limiting meaning where these terms appear in the description and claims. Thus, for example, a process that comprises "a" surfactant can be interpreted to mean a process that includes "one or more" surfactants. In addition, the term "comprising," which is synonymous with "including" or "containing," is inclusive, open-ended, and does not exclude additional unrecited elements or process steps.

As used herein, the term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the term "water" can include, for example, a brine, a connate water, surface water, distilled water, carbonated water, sea water and a combination thereof. For brevity, the word "water" will be used herein, where it is understood that one or more of "brine," "connate water," "surface water," "distilled water," "carbonated water," and/or "sea water" can be used interchangeably.

As used herein, a "surfactant" refers to a chemical compound that lowers the interfacial tension between two fluids.

As used herein, an "emulsion" refers to a mixture of two immiscible substances, where one substance (the dispersed phase) is dispersed in the other (the continuous phase).

As used herein, the term "supercritical phase" or "supercritical state" means a dense gas that is maintained above its critical temperature or critical pressure (the temperature or pressure above which it cannot be liquefied by pressure or temperature).

As used herein, the term "piping" means a system of pipes used to convey fluids (liquids and/or gases) from one location to another. In one or more embodiments of the present disclosure, the piping can include additional components such as fittings, valves, pumps and other devices to provide and control the flow of the fluid(s) through the piping.

As used herein, "turbulent" or "turbulent flow" means fluid moving in piping having a Reynolds number of at least 2100.

As used herein, "solubilizing," "solubilize," includes the property of a surfactant, as provided herein, to dissolve in supercritical carbon dioxide, as provided herein, to form a homogeneous solution (e.g., uniform in composition).

As used herein, the term "oil" refers to a naturally occurring liquid consisting of a complex mixture of hydrocarbons of various molecular weights and structures, and other organic compounds, which are found in geological formations beneath the earth's surface, referred to herein as an oil containing reservoir. "Oil" is also known, and may be referred to, as petroleum and/or crude oil.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments. In addition, discussion of features and/or attributes for an element with respect to one Figure can also apply to the element shown in one or more additional Figures. Embodiments illustrated in the figures are not necessarily to scale.

DETAILED DESCRIPTION

Embodiments of the present disclosure include a process and a system for solubilizing a surfactant into supercritical carbon dioxide ($scCO_2$) for use in enhanced oil recovery. In one or more embodiments, solubilizing the surfactant into $scCO_2$ can help to promote the formation of a stable emulsion formed of carbon dioxide and water.

Carbon dioxide ($CO_2$) can exist in four distinct phases depending upon its temperature and pressure. The four phases are as a solid, a liquid, a vapor (or gas), and a supercritical fluid. A supercritical fluid is a defined state of a compound, mixture or element above its critical pressure and critical temperature. In its supercritical state, carbon dioxide displays the properties of both a gas and a liquid. For example, like a gas it exhibits a higher diffusion coefficient compared to a liquid but maintains good solubility parameters like a liquid. Carbon dioxide as a supercritical fluid is stable above a critical pressure of 6.9 megapascal (MPa) and a critical temperature of 31° C. For one or more embodiments of the present disclosure the carbon dioxide can be in a fluid state either as a liquid and/or as a supercritical fluid and will be referred to herein as "supercritical carbon dioxide."

In one or more embodiments, the carbon dioxide injected into an oil containing reservoir can be in a supercritical state. In addition to the $scCO_2$, a surfactant and water can be included in the injection into the oil containing reservoir. Surfactants are usually organic compounds that are amphiphilic, meaning they contain both hydrophobic groups and hydrophilic groups, therefore they can be soluble in both organic solvents and water. In embodiments herein, the surfactant can lower the interfacial tension between two fluids (e.g., liquids), such as carbon dioxide and water. In one or more embodiments, surfactants used in the present disclosure can be ionic and/or nonionic. For the nonionic surfactants the hydrophilic group can be made up of a water soluble constituent (e.g., water-soluble constituent such as, for example, polyethylene oxide) rather than a charged species, which would be present in an ionic surfactant. Surfactants useful with the present disclosure can also be non-emulsifying with regard to water and oil.

When the surfactant is injected with the $scCO_2$ into the oil containing reservoir containing hydrocarbons (e.g., oil), the surfactant can promote the formation of an emulsion formed of carbon dioxide and water. As used herein an "emulsion" may include a "foam," which refers to a dispersion in which a gas is dispersed in a liquid. As used herein, foam and emulsion can be used interchangeably, however, to prevent confusion with other emulsions that can form (e.g., with water and oil), the emulsion formed of carbon dioxide and water using the surfactant will be referred to herein as an "emulsion."

In one or more embodiments, solubilizing the surfactant into the $scCO_2$ helps to better ensure the emulsion can be formed as the $scCO_2$ is injected from the piping of the injection system into the oil containing reservoir. In many cases, surfactants have limited solubility in $scCO_2$. As such, mass transfer may limit the process of solubilization. While it may be possible that the porous nature of the oil containing reservoir may act as a "static mixer" for at least the surfactant and the $scCO_2$, the possibility of the surfactant separating in a low velocity zone in the reservoir is a very real likelihood. In this case the surfactant could lead to formation damage, such as plugging or lowering the permeability of the formation. As such, it is preferable to solubilize the surfactant into the $scCO_2$ before the solution is injected into the oil containing reservoir (e.g., before the injected solution reaches the end of the piping of the injection system).

For the present disclosure, determining a maximum stable droplet diameter, mass transfer rates, and solubilization times for a surfactant in a $scCO_2$ in realistic scenarios has been undertaken. Results from this analysis can provide for optimization of a droplet diameter for the surfactant of less than a maximum stable droplet diameter calculated for a prevailing turbulent flow condition of the $scCO_2$. Optimizing the size of the surfactant droplet diameters to be less than the maximum stable droplet diameter helps to better ensure that the surfactant can fully solubilize in the $scCO_2$ before the mixture enters the oil containing reservoir.

To better ensure that the surfactant is solubilized into the $scCO_2$ before the end of the piping, the present disclosure provides for an injector to be used with a piping system that introduces the $scCO_2$, water and surfactant into the oil containing reservoir. In one or more embodiments, the injector helps to ensure that droplet diameter of the surfactant are less than the maximum stable droplet diameter for the prevailing turbulent flow condition of the $scCO_2$. In one or more embodiments, the injector used with the system of the present disclosure allows for the droplets of the surfactant to be rapidly formed in and distributed throughout a stream of $scCO_2$ to better ensure that the surfactant is completely solubilized into the $scCO_2$ prior to being delivered into an oil containing reservoir for enhanced oil recovery.

Referring now to FIG. 1, there is shown a system 100 according to one embodiment of the present disclosure for solubilizing a surfactant in $scCO_2$ to be delivered to an oil containing reservoir for enhanced oil recovery. As discussed herein, forming droplets of the surfactant with a diameter of less than the maximum stable droplet diameter in $scCO_2$ may help to better ensure that the surfactant can be completely solubilized into the $scCO_2$ prior to being delivered into the oil containing reservoir for enhanced oil recovery. For example, the system 100 may help to ensure that the surfactant will be solubilized into the $scCO_2$ within a downhole distances in the range of 1500 to 7000 feet, corresponding to nominal residence times of 140 to 670 seconds. As such, in one or more embodiments producing droplet diameters of the surfactant that have a residence time of less than 700 seconds in the $scCO_2$ is preferred.

As illustrated, the system 100 includes piping 102 containing $scCO_2$, a pump 104 to turbulently convey the $scCO_2$ through the piping 102, and an injector 106 associated with the piping 102. In one or more embodiments, the turbulent flow of the $scCO_2$ in the piping 102 and the configuration of the injector 106 help to decrease the mass-transfer resistance of the surfactant relative the $scCO_2$ by a reduction of the diffusion paths, while simultaneously increasing the surface area of the surfactant for mass transfer (e.g., forming droplets of the surfactant with a diameter of less than the maximum stable droplet diameter in prevailing $scCO_2$ conditions). In one or more embodiments, the configuration of the injector 106 ensures that the surfactant is injected into the turbulent flow of the $scCO_2$ (e.g., away from a wall 108 of the piping 102) so as to produce droplets of the surfactant having a diameter less than the maximum stable droplet diameter for the prevailing $scCO_2$ conditions. Based on the discussion provided herein, droplets of surfactant smaller than the maximum stable droplet diameter for the prevailing $scCO_2$ conditions may allow for the complete solubilization of the surfactant into the $scCO_2$ along the available length of the downhole piping 102.

For one or more embodiments, the injector 106 associated with the piping 102 can have a number of different configurations, as discussed herein. For example, as illustrated in FIG. 1, the injector 106 can have a tubular configuration that extends through a wall 108 of the piping 102. In one or more embodiments, the injector 106 includes a manifold 110 and a surface defining a port 112 that extends through the wall 114 of the injector 106 from the manifold 110. For the various embodiments, the injector 106 conveys the surfactant through the manifold 110 and the port 112 to inject a jet of the surfactant into the turbulent flow of the $scCO_2$ inside the piping 102. In one or more embodiments, the surfactant is injected at a predetermined volumetric value of relative the volumetric flow rate of the $scCO_2$.

As illustrated, the port 112 of the injector 106 is positioned away from the wall 108 of the piping 102, as injecting the surfactant near or at the wall may lead to "hugging" of the surfactant such that the desired droplet mean diameter may not be achieved. In one or more embodiments, the port 112 of the injector 106 can be positioned at approximately a radial center line 116 of the piping 102. In one or more embodiments, additional configurations of the injector 106 allow for the port 112 to be located away from the center line 116 so as to be closer to, but not at, the wall 108 of the piping 102.

In one or more embodiments, the port 112 of the injector 106 introduces a jet of the surfactant in a direction that cuts across the longitudinal flow direction 118 of the $scCO_2$ towards the wall of the piping 108. In one or more embodiments, the port 112 of the injector 106 introduces the jet of the surfactant perpendicular to the radial center line 116 of the piping 102 and the longitudinal flow direction 118 of the $scCO_2$. In one or more embodiments, the port 112 of the injector 106 introduces the jet of the surfactant at a non-perpendicular angle relative to the radial center line 116 of the piping 102 and the longitudinal flow direction 118 of the $scCO_2$. For one or more embodiments, the jet of the surfactant is physically and volumetrically sized to be introduced into the stream of the $scCO_2$ so as to provide rapid mixing and to create the droplet diameter of the surfactant in the $scCO_2$ that helps to ensure solubilization into the prevailing turbulent flow condition of the $scCO_2$.

In one or more embodiments, a methodology used to characterize the jet flow through the port 112 into the cross flow of the $scCO_2$ can be defined by a Jet Mixing Number (JMN) calculated by Equation 1:

$$\text{Jet Mixing Number} = \left(\frac{\text{jet velocity in port 112}}{\text{velocity in piping 102}}\right)\left(\frac{\text{diameter of port 112}}{\text{radius of piping 102}}\right) \quad \text{Equation 1}$$

As used herein, the value of the JMN provides an indication whether the jet flow of the surfactant through the port 112 permeates across the longitudinal flow direction 118 and onto the wall of the piping 102. For example, for JMN values from 0.01 to 1.0 allow the jet flow of the surfactant to permeate the longitudinal flow direction 118 of the $scCO_2$, turning before it hits the wall 108 of the piping 102. For JMN values of 1.0 or greater the jet flow permeates the longitudinal flow direction 118 of the $scCO_2$ to contact the wall 108 of the piping 102, which can result in back mixing with subsequent "hugging" of the wall by the surfactant. Preferably, the injector 106 conveys the surfactant through the port 112 to inject the surfactant into the turbulent flow of the supercritical fluid so as to achieve a JMN of 0.01 to 1.0, where a JMN of 0.07 is one specifically preferred value.

In one or more embodiments, both the size and the cross-sectional shape of the port 112 can be selected to best achieve the desired JMN with the piping 102 and the velocity of the $scCO_2$. For example, the port 112 can have one of a number of different cross-sectional shapes. These include, but are not limited to, circular, non-circular (e.g., elliptical), triangular, rectangular and other polygonal shapes, among others. In one embodiment, for example, the port 112 can have a circular cross-sectional shape having a diameter of about 1 millimeter.

Other sizes are possible, where the JMN along with other values of the velocity of the $scCO_2$ and the surfactant and the diameter of the piping 102 can be used to determine size (e.g., diameter) of the port 112.

In addition, the walls defining the openings can be tapered (e.g., beveled) or un-tapered (i.e., cross-sectional area changes or does not change along the depth of the port 112). In an additional embodiment, when two or more ports 112 are present (as will be more fully discussed herein), the cross-sectional shapes and/or sizes need not be constant for the ports 112. For example, the ports 112 can have a variety of cross-sectional shapes, sizes, directions relative the radial center line 116 and profiles for a given injector 106.

In one or more embodiments, the injector 106 can be formed from a corrosion resistant material. As used herein, corrosion resistant materials include those materials that resist reacting to or do not react with the surfactant and/or the $scCO_2$ used with the system for enhanced oil recovery. Examples of suitable corrosion resistant materials used to form the injector 106 can include titanium, titanium alloys (e.g., grade 7 titanium), austenitic stainless steels, ferritic stainless steels, precipitation hardenable stainless steel, among others.

In one or more embodiments, the piping 102 can have a circular cross-sectional shape taken perpendicular to the radial center line 116. Other cross-sectional shapes are possible. In addition, the piping 102 can have a constant diameter in the vicinity of the injector 106. In one or more embodiments, the piping 102 can include a venturi. For example, a venturi can be included immediately upstream and/or downstream of the injector 106. In one or more embodiments, the injector 106 can be positioned along the length of a venturi (e.g., the port 112 is located in the venturi of the piping 102).

In one or more embodiments, the pump 104 can provide the supercritical fluid with the turbulent flow (e.g., Reynolds number of at least 2100) through at least a portion of the piping 102. Examples of such pumps include, but are not limited to, a pneumatic booster pump, among others. As discussed herein, $scCO_2$ is used in the system 100. Other supercritical fluids besides or in addition to $scCO_2$ could also be used in the system 100.

As the example of FIG. 1 illustrates, the port 112 on injector 106 can be a single port 112 located at either the radial surface of the injector 106 (as illustrated in FIG. 1) or at the end 120 of the injector 106. Additional embodiments of the injector 106 discussed herein, however, can include more than one port 112. As will be appreciated, the number, the size, the spacing and/or the distribution of the ports 112 can be configured to ensure mechanical integrity of the injector 106 and to ensure that the surfactant injected through the port 112 does not impinges on the wall 108 of the piping 102 (i.e., the JMN is from 0.01 to 1.0).

In one or more embodiments, examples of surfactants useful with the present disclosure include those found in U.S. Pat. No. 6,686,438 to Beckman and U.S. Pat. No. 5,789,505 to Wilkinson, and the U.S. Pat. Application entitled "Compositions for Oil Recovery and Methods of Their Use," U.S. patent application Ser. No. 61/196,235.

Figure 2:
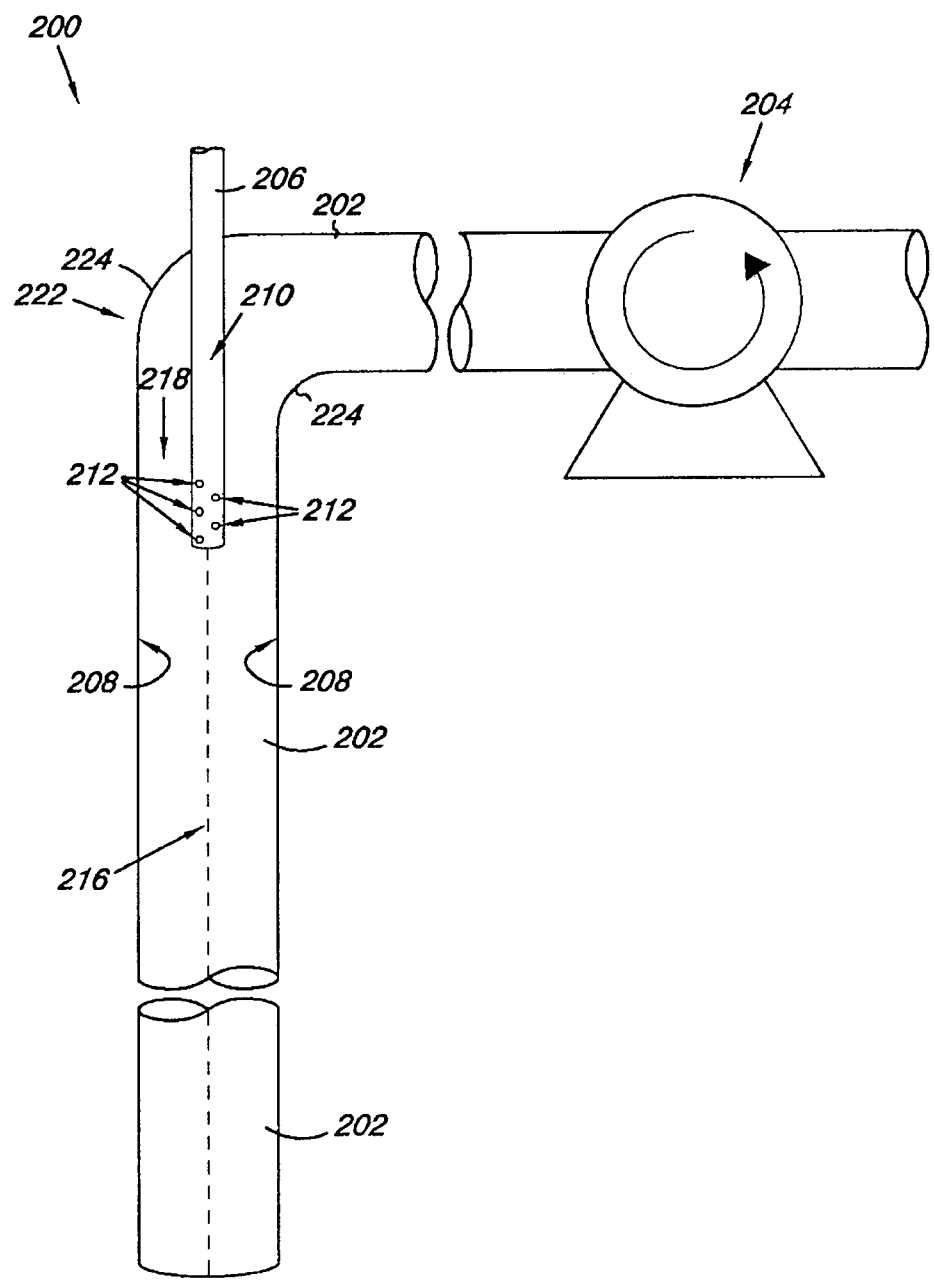
FIG. 2 illustrates one embodiment of a system for solubilizing a surfactant in supercritical carbon dioxide according to the present disclosure.

FIG. 2 provides an illustration of an addition embodiment of the system 200 according to the present disclosure. In one or more embodiments, the injector 206 includes two or more ports 212 that are selected to provide sufficient segmentation and droplet diameter of the surfactant in the $scCO_2$ flow, as discussed herein. In addition, each of the ports 212 can be independently oriented relative the radial center line 216 as discussed herein (e.g., oriented to produce a jet perpendicular and/or non-perpendicular to the longitudinal flow direction 218 of the scCO$_2$). Likewise, each of the ports 212 can independently have cross-sectional shapes and/or sizes as discussed herein.

FIG. 2 further illustrates an embodiment of the system 200 that includes a fitting 222 that can be used to add energy dissipation to assist in surfactant droplet solubilization (e.g., increase local turbulence of the scCO$_2$ in an around the ports 312 of the injector 204) and/or to served to make the system 200 more compact. As illustrated, the piping 202 includes an elbow 224 upstream of the injector 202, where the injector 202 passes through the volume defined by the wall of the elbow 224.

The embodiment of the system 200 illustrated in FIG. 2 also provides an example in which the ports 212 are uniformly (e.g., concentrically) arranged relative the radial center line 216 of the region of piping 202 when the injector 206 is concentrically located with the radial center line 216. In an alternative embodiment, the ports 212 can be non-uniformly distributed (e.g., eccentrically) arranged relative the radial center line 216 of the region of piping 202 where the injector 206 is positioned eccentric relative the radial center line 216. Other configurations are possible.

The manifold 210 of injector 206 also has a sufficient volume to ensure uniform flow from each of the ports 212 of the injector 206 (e.g., the manifold 210 of the injector 206 has a relatively large cross-sectional area relative to the cross-sectional area of each port 212 so that the pressure variations in the manifold 210 are negligible). For example, the pressure drop for the surfactant across each of the ports 212 can be greater than 10 times the pressure drop over the length of the manifold 210. This allows for uniform surfactant flow from each of the ports 212 while avoiding any issues of backflow of the scCO$_2$ into the injector 202.

Figure 3:
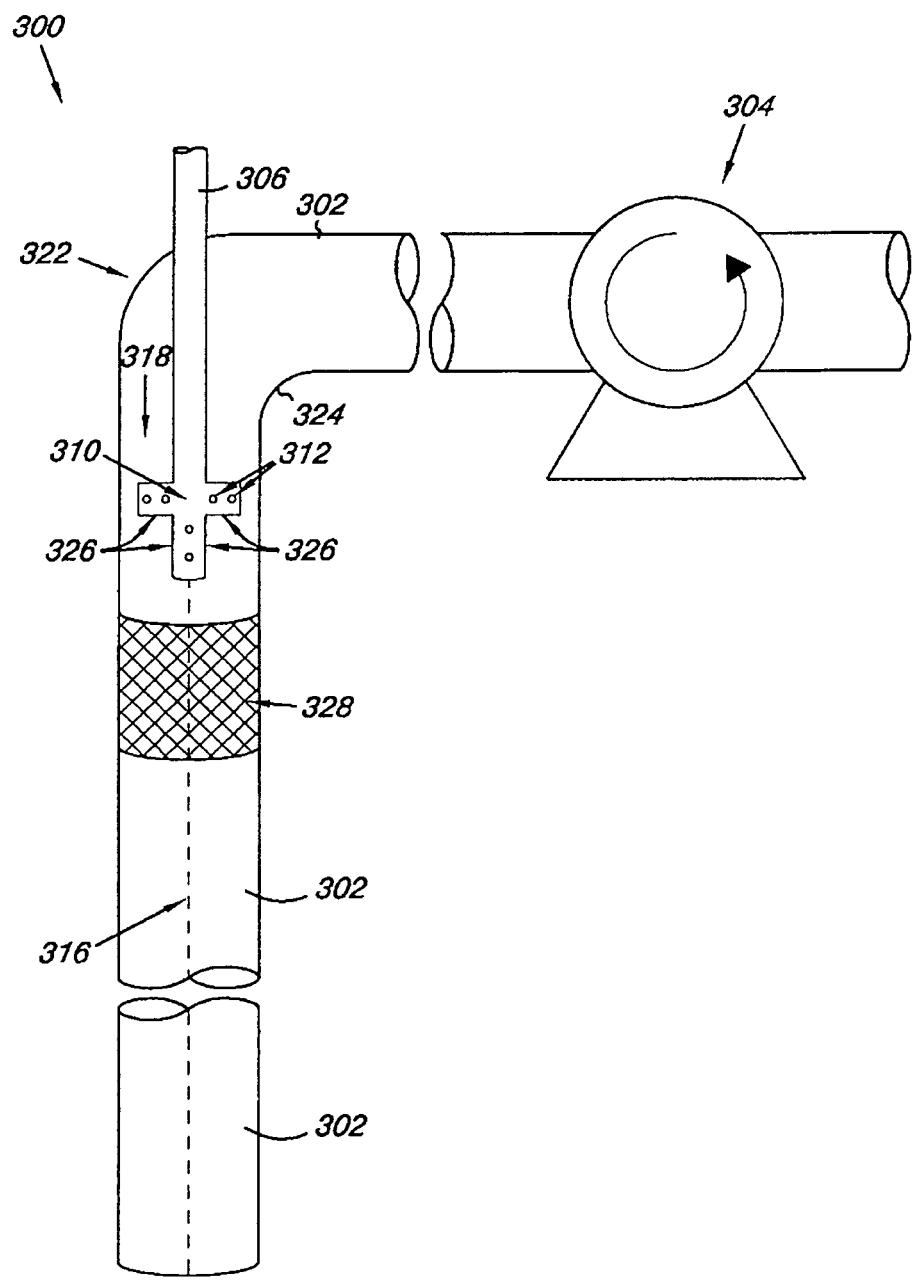
FIG. 3 illustrates one embodiment of a system for solubilizing a surfactant in supercritical carbon dioxide according to the present disclosure.

FIG. 3 provides an illustration of an addition embodiment of the system 300 according to the present disclosure. In one or more embodiments, the injector 306 includes two or more arms 326 (e.g., forming a cross pattern), where each arm 326 includes two or more ports 312 that are selected to provide sufficient segmentation and droplet diameter of the surfactant in the scCO$_2$ flow, as discussed herein. As discussed herein, each of the ports 312 can be independently oriented relative the radial center line 316, and can independently have cross-sectional shapes and/or sizes as discussed herein.

The system 300 includes a fitting 322, as discussed herein. In addition, the system 300 further includes a static mixer 328 in the piping 302. In turbulent flow, the use of the static mixer 328 helps to augment the occurring turbulence to accelerate mixing. Types of static mixers can include, but are not limited to, KVM, HEV and SMV type static mixers, among others. Wall-mounted tabs and/or vanes can also be used to help augment the occurring turbulence to accelerate mixing in the system 300. Other alterations in the flow path along the piping 302 can also be included. These can include, but are not limited to, single or multiple hole orifice plant(s), half-moon orifice plates, screens, or other restricting devices that could potentially enhance droplet dispersion.

Figure 4:
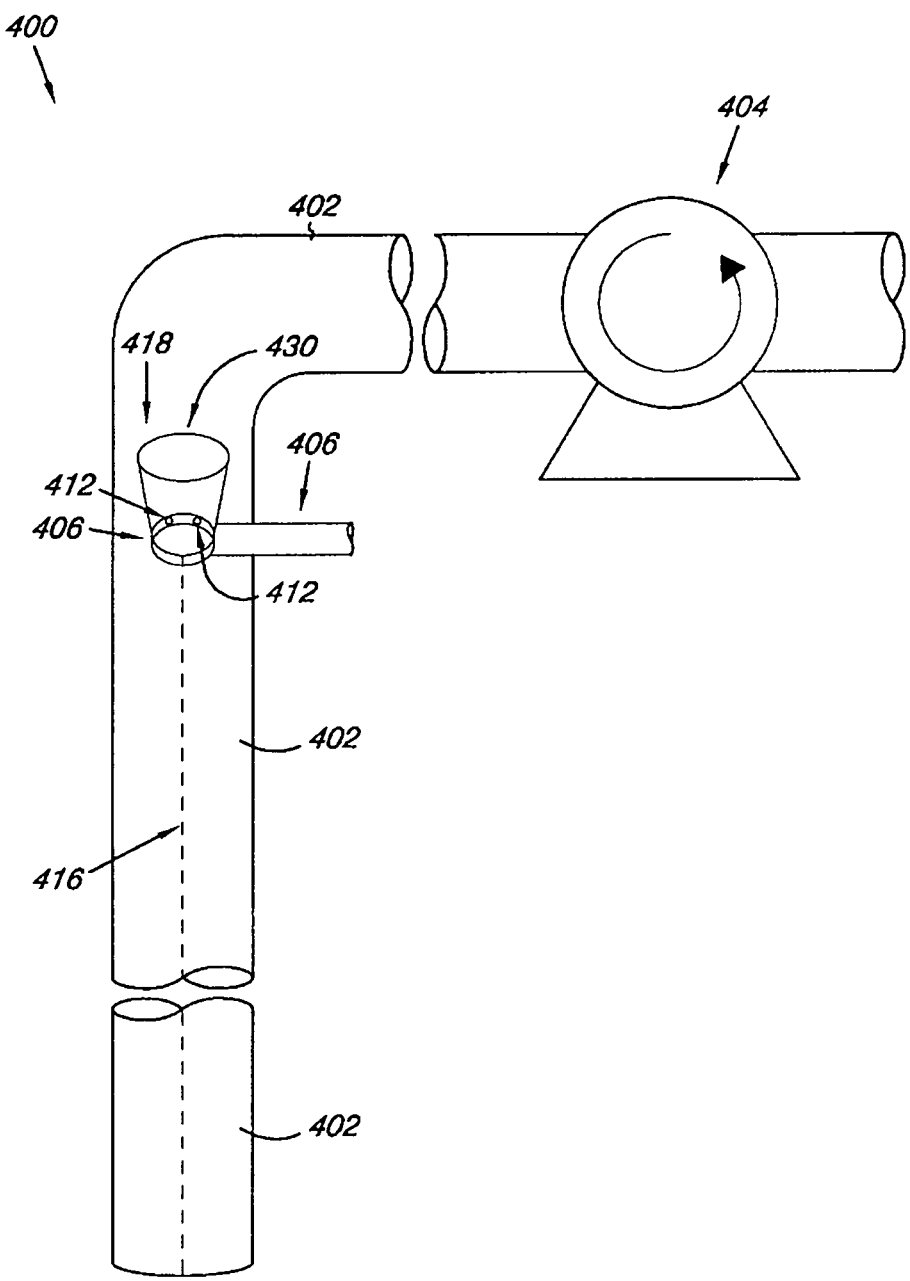
FIG. 4 illustrates one embodiment of a system for solubilizing a surfactant in supercritical carbon dioxide according to the present disclosure.

FIG. 4 provides an example of an alteration used in the flow path along the piping 402. As illustrated, the piping 402 can include a hollow conical insert 430 positioned relative the injector 406. In the embodiment of FIG. 4, the injector 406 includes a sparger ring, where the ports 412 can be located on an inner ring surface and/or an outer ring surface (FIG. 4 provides in illustration with the ports 412 on the inner ring surface).

For the various embodiments, the hollow conical insert 430 can help to accelerate the flow of the scCO$_2$ in the vicinity of the ports 412. In one or more embodiments, the hollow conical insert 430 can have linear walls, as illustrated, to provide what is essentially a cone segment. In one or more embodiments, the hollow conical insert 430 can have walls that curve at least along a portion of their length, to provide for more of a bell shaped structure. Other shapes are possible.

In one or more embodiments, the hollow conical insert 430 can be positioned upstream of the injector 406 with the outlet of the conical insert 430 aligned with the one or more ports 412. The illustration provided in FIG. 4 has the hollow conical insert 430 flush with a leading edge of the injector 406. In one or more embodiments; however, the hollow conical insert 430 could be located inside the area defined by the sparger ring of the injector 430 or outside the area defined by the sparger ring of the injector 430.

In addition to providing a surfactant into the stream of scCO$_2$ according to the various embodiments of the present disclosure, other liquid additives could also be injected, with or without the surfactant, using the injector of the present disclosure. Such liquids could include, but are not limited to, corrosion inhibitors, scale inhibitors, biocides, hydrate inhibitors, and demulsifiers, among others.

EXAMPLE

The following example provides an illustration and an approach to determining the maximum stable droplet diameter, mass transfer rates, and solubilization times for an exemplary surfactant in a scCO$_2$. Results from this analysis can provide for optimization of the droplet diameter for the surfactant of less than a maximum stable droplet diameter calculated for a prevailing turbulent flow condition of the scCO$_2$.

According to the present example, parameters are assigned for a mass transfer coefficient $k_L$ range, surfactant-scCO$_2$ interfacial tension a, and surfactant solubility in scCO$_2$. The maximum stable droplet diameter due to turbulence, required to calculate the interfacial area per volume "a", was estimated based on the friction factor, flow conditions, and physical properties found during this exemplary process and a system for solubilizing a surfactant into scCO$_2$ for use in enhanced oil recovery.

The bases for calculations for solubilizing the surfactant into the scCO$_2$ are provided as follows. For the scCO$_2$ the pressure was take at 2000 psi with a temperature of 40° C., a flow rate of 11 million (MM) standard cubic foot per day (@0.11 lb/scf=>14.0 lb/s=6.4 kg/s), a density 800 kg/m$^3$, and a viscosity of 0.1 cP. For the surfactant phase, the surfactant was Experimental Surfactant 08-1015 supplied by the Dow Chemical Company, used neat (e.g., no solvent added), with a number average molecular weight of 372, with a flowrate based on a concentration of 0.1 wt % in scCO$_2$ after mixing, having a density 1100 kg/m$^3$, a viscosity 50 cP, and a saturation concentration in scCO$_2$ 2000 parts per million (ppm). The piping system was taken as follows, a downhole piping having a diameter of 2.212 inches (5.618 cm), a roughness of the piping wall of 0.00021 inch (0.00533 mm) and a length of 7000 feet (2133.6 meters) of downhole depth for the initial trials. The velocity of the scCO$_2$ in the tubing is 3.2 m/s. The resulting Reynolds number (Re) is calculated to be 1.45×10$^6$, which provides for turbulent flow. The maximum stable droplet diameter of the surfactant formed in the turbulent flow of the scCO$_2$ for use in enhanced oil recovery was estimated at 700 μm and the volume-to-area (Sauter) mean at 470 µm. The following is a discussion of how these values were evaluated and then calculated.

A standard film model for mass transfer is used in the present calculations:

$$\left.\frac{dC_{surf}^{scCO2}}{dt}\right|_{MT} = k_L a(C_{surf,sat}^{scCO2} - C_{surf,bulk}^{scCO2}) \quad \text{Equation 2}$$

where the left hand side of the equation is the molar flow rate (per volume) of surfactant from droplets to the $scCO_2$ phase, $k_L$ is the mass transfer coefficient, "a" is the droplet interfacial area per unit volume, $C_{surf,sat}^{scCO2}$ is the saturation concentration of surfactant in $scCO_2$, and $C_{surf,bulk}^{scCO2}$ is the bulk concentration of surfactant in the $scCO_2$ at a given time (length) in the piping. The equation is solved for $C_{surf,bulk}^{scCO2}$. Note that since the surfactant is neat, i.e. solvent-free, mass transfer resistance is not expected in the surfactant phase because no concentration gradient can arise there. Hence the $k_L$ in the above equation is the value for transport limitations on the $scCO_2$ side of the phase boundary.

From the literature, it is known that the mass transfer coefficients of pure α-tocopherol (Vitamin E, MW 430) in a $scCO_2$ system have values that range from $1.00 \times 10^{-5}$ m/s for a $k_L$ minimum to a $k_L$ maximum of $3.00 \times 10^{-5}$ m/s. Reynolds numbers used in studying these mass transfer values ranged from 200 to 3000 in channel flow. From this study, a linear log-log plot of $k_L$ versus Reynolds number for each $scCO_2$ density tested provided that for a $scCO_2$ density of about 800 kg/m³, the mass transfer coefficient was about $3 \times 10^{-5}$ m/s at a Re of 3000 in the channel. Following Kawase et al, the mass transfer coefficient is expected to grow with the 0.25 power of the energy dissipation rate ϵ (Kawase, Y., Halard, B., Moo-Young, M., "Theoretical Prediction of Volumetric Mass Transfer Coefficients in Bubble Columns for Newtonian and Non-Newtonian Fluids," *Chem. Eng. Sci.*, 42 1609-1617 (1987)). For pipe flow, ϵ is proportional to the square of the liquid velocity. Hence the impact in extrapolating from a Reynolds number of 3000 to $1.45 \times 10^6$ used in the present calculations results in a mass transfer coefficient extrapolation from $3 \times 10^{-5}$ to $6.6 \times 10^{-4}$ m/s.

Since this is a rather large extrapolation, another method was used to verify this value. Higbie's penetration theory for gas-liquid mass transfer (Higbie, R., "The Rate of Absorption of a Pure Gas into a Still Liquid during Short Periods of Exposure," *Trans. Am. Inst. Chem Eng.*, 31, 365-389(1935) and Danckwerts, P. V., Kennedy A. M., "Kinetics of liquid-film process in gas absorption, Part 1: Models of the absorption process," *Trans. Inst. Chem Engrs*, 32, s49-s53 (1954)) supposes that an element of fluid is exposed to the phase interface for time $t_e$, then is replaced with a new fluid element. When Kalmogoroff's time scale is used for $t_e$ (Kawase, Y., Halard, B., Moo-Young, M., "Theoretical Prediction of Volumetric Mass Transfer Coefficients in Bubble Columns for Newtonian and Non-Newtonian Fluids," *Chem. Eng. Sci.*, 42 1609-1617 (1987)), Higbie's equation for calculation of $k_L$ becomes:

$$k_L = \frac{2}{\sqrt{\pi}} \sqrt{D_{AB}} \left(\frac{\varepsilon}{\nu}\right)^{1/4} \quad \text{Equation 3}$$

where $D_{AB}$ is the diffusion coefficient of the solute in the $scCO_2$, ϵ is the energy dissipation rate in the fluid, and ν is the kinematic viscosity. While the equation was derived for gas-liquid systems, it would seem that the derivation should apply to liquid-supercritical fluid systems as well, as long as the continuous phase (where the turbulence is being dissipated) is rate limiting for the mass transfer.

Equation 3 requires an estimate for the diffusion coefficient. Diffusion coefficients in supercritical fluids were studied by Tan (Tan, C.-S., Liang, S.-K., Liou, D.-C., "Fluid-Solid Mass Transfer in a Supercritical Fluid Extractor," *Chem. Eng. J.*, 38, 17-22 (1988)) for essential oils. For β-naphthol in $scCO_2$, for instance, at same conditions for the surfactant and $scCO_2$ provided above, the diffusion coefficient falls very close to $1 \times 10^{-8}$ m²/s, and order of magnitude larger than is typical in liquids. This is in general agreement with trends shown by Debenedetti & Reid (Debenedetti, P. G., Reid, R. C., "Diffusion and Mass Transfer in Supercritical Fluids," *AIChE J.*, 32, 2034-2046 (1986)) for β-napthhol and benzoic acid, measured at higher temperatures and pressures. Surfactants used in enhanced oil recovery processes, such as those provided herein, will likely have a lower diffusion coefficient due to their larger molecular weights MW (e.g., 772 vs. 144). The diffusion coefficient is expected to vary with the inverse of the molecular radius by the Stokes-Einstein relation (Atkins, P. W., *Physical Chemistry*, 2nd ed., W. H. Freeman & Co., San Francisco, 1982).

If r for the surfactant is conservatively taken to be about 5 times that of β-naphthol, a diffusion coefficient of $2 \times 10^{-9}$ m²/s is calculated. With ϵ calculated as 4.0 W/kg (the estimation of which is discussed more fully below) and ν as $1.25 \times 10^{-7}$ m²/s, the value of $k_L$ is then calculated to be $3.5 \times 10^{-3}$ m/s, some 5 times larger than extrapolated from the $\varepsilon^{1/4}$ rule from Zehnder's data for Vitamin E. Hence it can be inferred that the previous extrapolated value of $6 \times 10^{-4}$ m/s is not excessive and is most probably conservative.

General correlations for droplet diameter commonly correlate with the continuous phase Sherwood number, $Sh_c$, $$Sh_c = \frac{k_L d_{32}}{D_c} \quad \text{Equation 4}$$

The lower limiting value of $Sh_c$, derived by Langmuir (Kumar, A., Hartland, S., "Correlations for prediction of mass transfer coefficients in single drop systems and liquid-liquid extraction columns," *Trans. IChemE*, 77 A 372-384, July 1999 and Langmuir, I., "The Evaporation of Small Spheres," *Phys. Rev.*, 12, 368-370, 1918) for stagnant conditions, is a value of 2. This represents a lower limit to the mass transfer due to the absence of convection. Taking the diffusion coefficient derived above and a droplet diameter of 500 µm, $k_L$ is calculated as $8 \times 10^{-6}$ m/s, nearly two orders of magnitude smaller than previous low-side extrapolated value and in line with expectations for stagnant conditions.

Interfacial Tension, σ

The interfacial tension is a parameter needed in order to calculate the maximum stable droplet diameter in a flow field. Values of components in the literature vary, but no data were found for a pure surfactant in $scCO_2$. The closest found was from Galy et al. (Galy, J., Sawada, K., Fournel, B., Lacroix-Desmazes, P., Lagerge, S., Persin, M., "Decontamination of solid substrates using supercritical carbon dioxide—Application with trade hydrocarbonated surfactants," *J. of Supercritical Fluids*, 42, 69-79 (2007)) who studied EO-PO triblock copolymer surfactants of various molecular weights in the system water-scCO$_2$. Without surfactant, the interfacial tension is near 10 dyne/cm at the pressure of interest in this study. The values with added surfactant were measured in the range of 2-10 dynes/cm. The value 10 dyne/cm is taken as a conservative estimate.

Saturation Concentration, $C_{surf,sat}^{scCO2}$

The surfactant used in the present calculations is known to be soluble in scCO$_2$ at 1000 ppm. The saturation value was estimated to be 2000 ppm. For comparison, the results of Haruki et al. (Haruki, M., Yawata, H., Nishimoto, M., Tanto, M., Kihara, S., Takishima, S., "Study on phase behaviors of supercritical CO$_2$ including surfactant and water," *Fluid Phase Equilibria*, 261, 92-98 (2007)) show the solubility of a branched surfactant to be near 4000 ppm in scCO$_2$. The surfactant of Haruki et al. was polyethylene oxide-2,6,8-trimethyl-4-nonyl ether (TMN) with number average MW of 420. The number average MW of the surfactant used in the present calculations is 772. Hence the estimated saturation value of 2000 ppm is consistent with Haruki et al.

Calculation of Maximum Stable Droplet Diameter of the Surfactant in scCO$_2$

The calculation of the maximum stable droplet diameter of the surfactant in scCO$_2$ is based on the following model for a slice of scCO$_2$ fluid having surfactants droplets moving through an injection tube. Take a slice of scCO$_2$ fluid of diameter D, differential width l, containing surfactants droplets of diameter $d_p$ with volumetric phase fraction $\phi_j$ for phase j. The surfactant droplets will shrink in mass as the surfactant is transported into the scCO$_2$ phase. The following are assumptions for transport of the surfactant droplets: (1) surfactant droplet coalescence and fragmentation are ignored, due to the relatively low phase fraction of surfactant involved; (2) transport resistance is on the scCO$_2$ side since the surfactant phase is neat, hence there can be no concentration gradient in that phase and (3) surfactant droplets are convected with the same velocity as scCO$_2$. Based at least in part on these assumptions, the following equations can be written:

$$\phi_{surfactant} = \frac{\text{volume of surfactant phase}}{\text{volume of all phases}} \quad \text{Equation 5}$$

Fraction surfactant transferred = Equation 6

$$F_{surf}(t) = \int_0^t \frac{k_L a(c_{surf,sat}^{scCO2} - c_{surf,bulk}^{scCO2})}{c_{surf}^{surf}(0)\phi_{surf}(0)} dt$$

$$\text{droplet diameter} = d_p(t) = d_p(0)\left(\frac{F_{surf}}{\phi_{surf}(0)}\right)^{1/3} \quad \text{Equation 7}$$

$$V^{scCO2} = (1 - \phi_{surf})\left(\frac{\pi D^2 l}{4}\right) \quad \text{Equation 8}$$

$$\frac{d\phi}{dt} = \frac{d}{dt}\left(\frac{V^{org}}{V^{tot}}\right) = \frac{\pi}{4V^{tot}}\frac{d}{dt}(n_p d_p^2) = \frac{M}{V^{tot}\rho^{org}} \quad \text{Equation 9}$$

where M is the net mass transfer (mass per time) between the phases. This is calculated from the mass transfer coefficient equation:

$$\left(\frac{d c_{surf}^{scCO2} V^{aq}}{dt}\right) = \sum_j k_L a(c_{surf,sat}^{scCO2} - c_{surf,bulk}^{aq}) = \frac{M}{MW_{surf}}. \quad \text{Equation 10}$$

Surfactant Maximum Stable Droplet Diameter Calculation

Hanzevack & Demetriou looked at droplet diameter distributions after short lengths of pipe, including straight runs and elbows (Hanzevack, E. L., Demetriou, G. D., "Effect of Velocity and Pipeline Configuration on Dispersion in Turbulent Hydrocarbon-Water Flow using Laser Image Processing," *Int. J. Multiphase Flow*, 15, 985-996 (1989)). For a length of 80 diameters of straight horizontal pipe (8.2 cm diameter), the maximum droplet diameter was found to be 1600 μm at a velocity exceeding 2 m/s. Most droplets were less than 500 μm in diameter. This provides an upper bound to maximum stable droplet diameter in a turbulent pipe.

For the exemplary process and system provided herein the Reynolds number (=Dvρ/μ, where ρ is the average density, μ is the average viscosity, v is the average velocity, and D is the pipe diameter) is 1.45×10$^6$, showing that the system is highly turbulent. The velocity in the downhole piping is 3.2 m/s, showing that the residence time is 140 seconds for 1500 ft (457 m) of depth and 670 seconds for 7000 ft (2130 m) of depth.

The maximum stable droplet diameter was shown by Davies to equal $$d_{max} = C\left(\frac{\sigma}{\rho_c}\right)^{3/5} \varepsilon^{-2/5} \quad \text{Equation 11}$$

where C is a constant in the range of 0.5-1 for standard mixing devices (0.68 for pipe and static mixer flows), σ is the surface tension, $\rho_c$ is the density of the continuous (scCO$_2$) phase, and ε is again the energy dissipation rate in the pipe (Davies, J. T., "A Physical Interpretation of Drop Sizes in Homogenizers and Agitated Tanks, Including the Dispersion of Viscous Oils," *Chem. Eng. Sci.*, 42, 1671-1676 (1987)). The mean droplet diameter is normally taken to be 2/3 of the $d_{max}$. This expression is for droplet viscosities on the order of 1 cP. A viscosity correction is applied based on the data of Berkman & Calabrese, (equation 17 of Davies):

$$d_{max} = C\left(\frac{\sigma}{\rho_c}\right)^{3/5} \varepsilon^{-2/5}\left[1 + \frac{1.4v'\mu_d}{\sigma}\right]^{3/5} \quad \text{Equation 12}$$

where v' is the fluctuating velocity, taken as 5% of the mean velocity, hence 0.16 m/s for the flow of scCO$_2$ used herein. The viscosity correction amounts to a 56% increase in $d_{max}$ over a water-like viscosity dispersed fluid.

In order to estimate the energy dissipation rate, the pressure drop through the downhole piping is required. Based on the aforementioned roughness factor of 0.00021 inches and Reynolds number of 1.45×10$^6$, the friction factor f was taken as 0.0033 (McCabe, W. L., Smith, J. C., *Unit Operations of Chemical Engineering*, 3$^{rd}$ ed., 1976). The pressure drop equation for open pipe defines the friction factor:

$$\Delta p = \frac{2f\Delta L \rho v^2}{g_c D} \quad \text{Equation 13}$$

The hydraulic power applied to the fluid is the pressure drop times the volumetric flow:

$$P = \Delta p V = \Delta p \frac{\dot{m}}{\rho} \quad \text{Equation 14}$$

If the pressure drop is calculated for a unit amount of pipe length, the mass contained in that length of pipe receives the energy dissipation. Hence a power per mass (energy dissipation rate) is calculated:

$$\varepsilon = \frac{P}{\frac{\pi}{4} D^2 L \rho}$$ Equation 15

For the conditions of the exemplary process and system, the energy dissipation rate $\varepsilon$ is calculated to be 4.0 W/kg. Hence, taking C equal to 0.68, $\sigma$ as 10 dyne/cm, and $\rho_c$ as 800 kg/m$^3$, $d_{max}$ is calculated to be 700 μm, which is consistent with Hanzevack et al. (Hanzevack, E. L., Demetriou, G. D., "Effect of Velocity and Pipeline Configuration on Dispersion in Turbulent Hydrocarbon-Water Flow using Laser Image Processing," *Int. J. Multiphase Flow*, 15, 985-996 (1989)). The volume-to-area (Sauter mean) diameter, $d_{32}$ is then taken as 2/3$^{rds}$ of this value, which is 470 μm.

The estimated parameters and droplet diameter were then used with the 1-Dimensional (1-D) mass transfer model as expressed in Equation 2. With a high end estimate of $k_L$, generated from Higbie's penetration model using the Kolmolgoroff time scale for renewal rate, no problems with surfactant solubilization should occur for the downhole distances considered. The half-life of the biggest droplets is about 15 seconds, equivalent to 160 ft of piping at nominal velocity.

Figure 5:
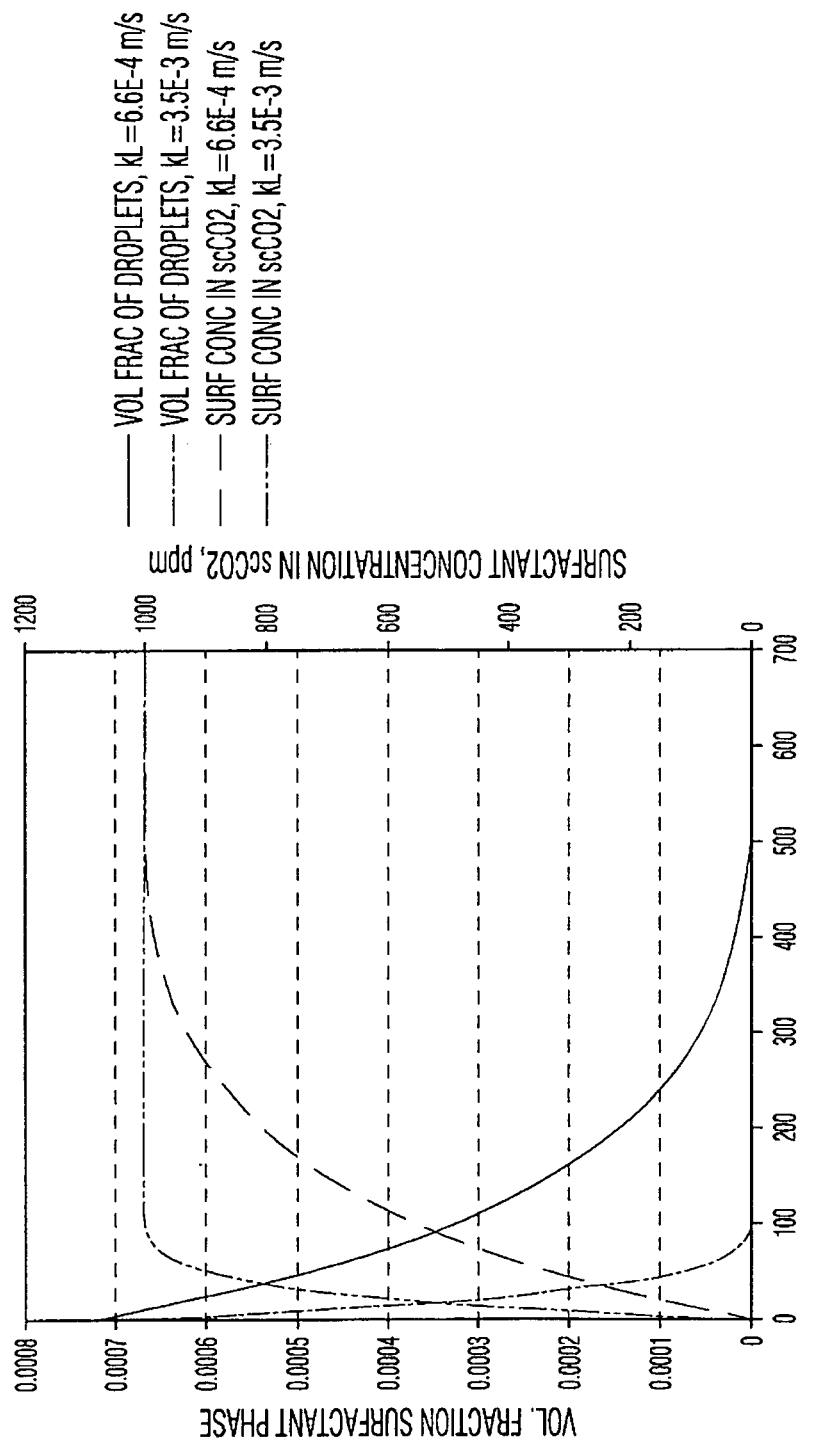
FIG. 5 illustrates results for a 1-Dimentional (1-D) mass transfer calculation for 700 μm initial droplet diameter into supercritical carbon dioxide ($scCO_2$) according to the present disclosure.
Figure 6:
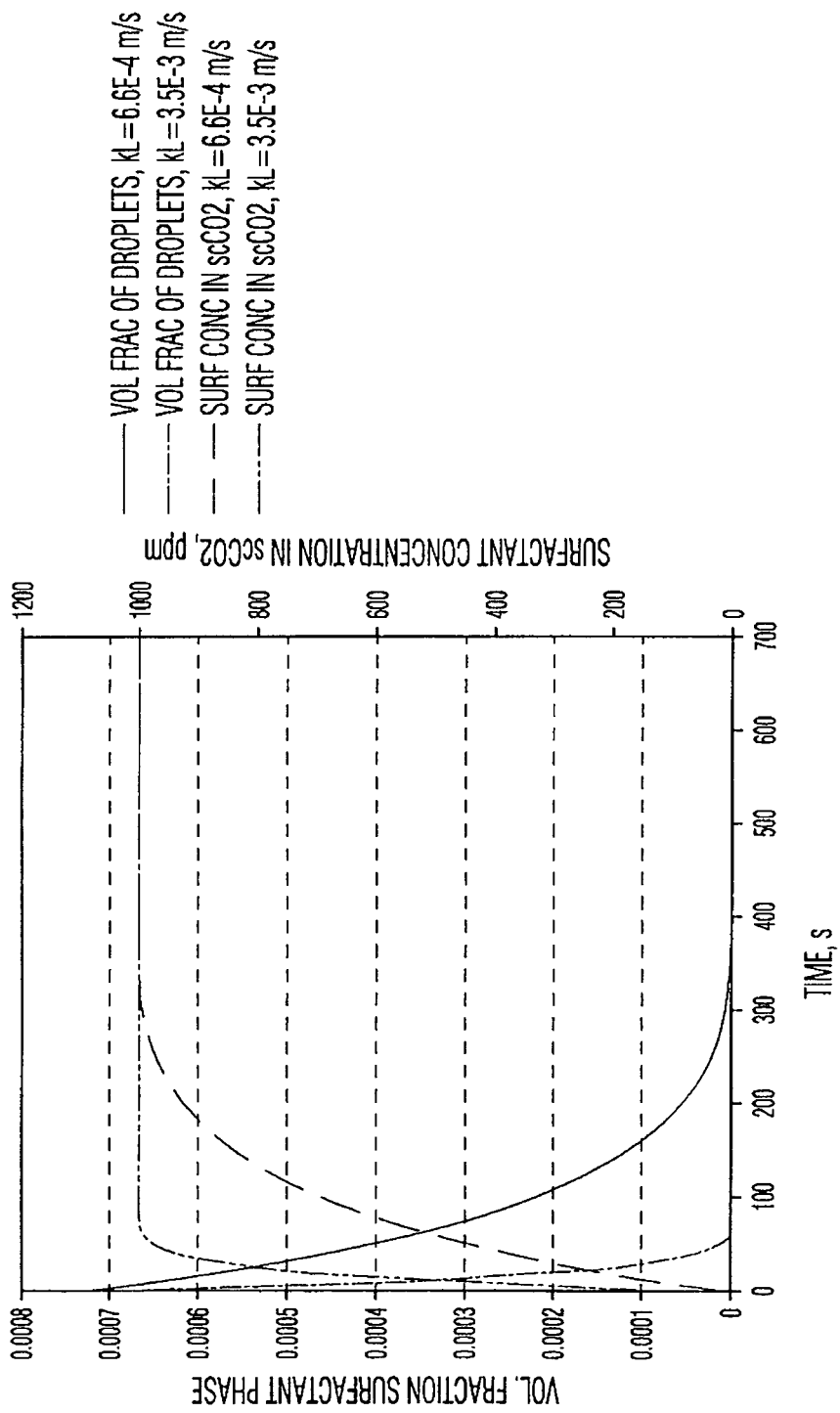
FIG. 6 illustrates results for a 1-D mass transfer calculation for 470 μm initial droplet diameter into $scCO_2$ according to the present disclosure.
Figure 7:
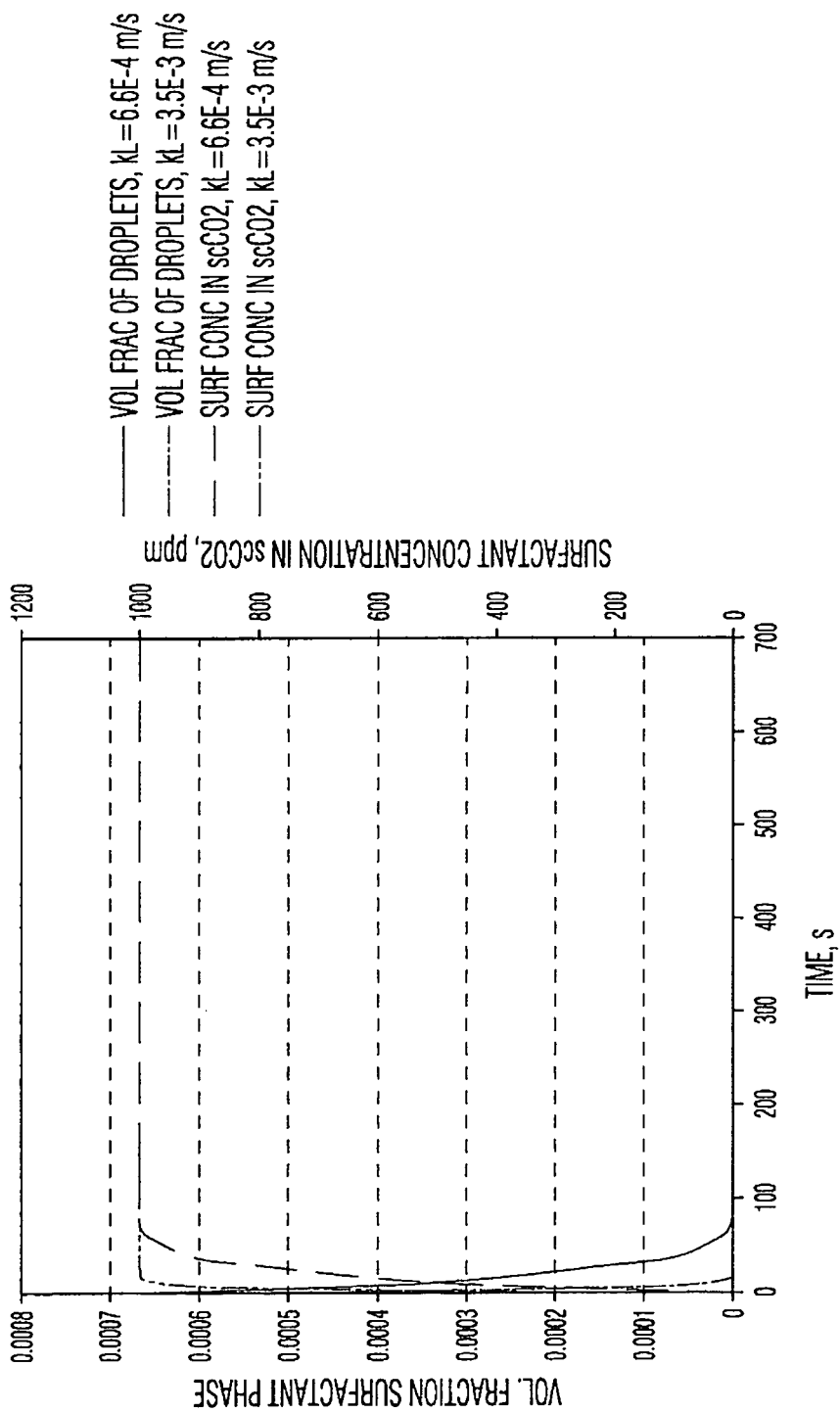
FIG. 7 illustrates results for a 1-D mass transfer calculation for 100 μm initial droplet diameter into $scCO_2$ according to the present disclosure.

FIGS. 5 through 7 show the 1-D mass transfer calculations for droplet diameter of 700 μm, 470 μm, and 100 μm, respectively, into scCO$_2$. The calculations are based on Equations 5 to 10, and include curves for the low and high-end estimates of $k_L$, 6.6×10$^{-4}$ and 3.5×10$^{-3}$ m/s. For the Figures, 140 seconds is the residence time at 1500 ft downhole depth and the curves with the high value of $k_L$ show that all drops will solubilize within this time frame. For the low value of $k_L$, however, a fraction of the surfactant droplets may be left at the 140 second point. FIG. 6 shows that the volume fraction of droplets is 820 ppm at 140 seconds, showing 18% is yet to be dissolved. This is representative of the mixture as a whole. In this case 350 seconds is needed to ensure full solubilization, equivalent to 3700 feet of pipe at nominal velocity.

Figure 8:
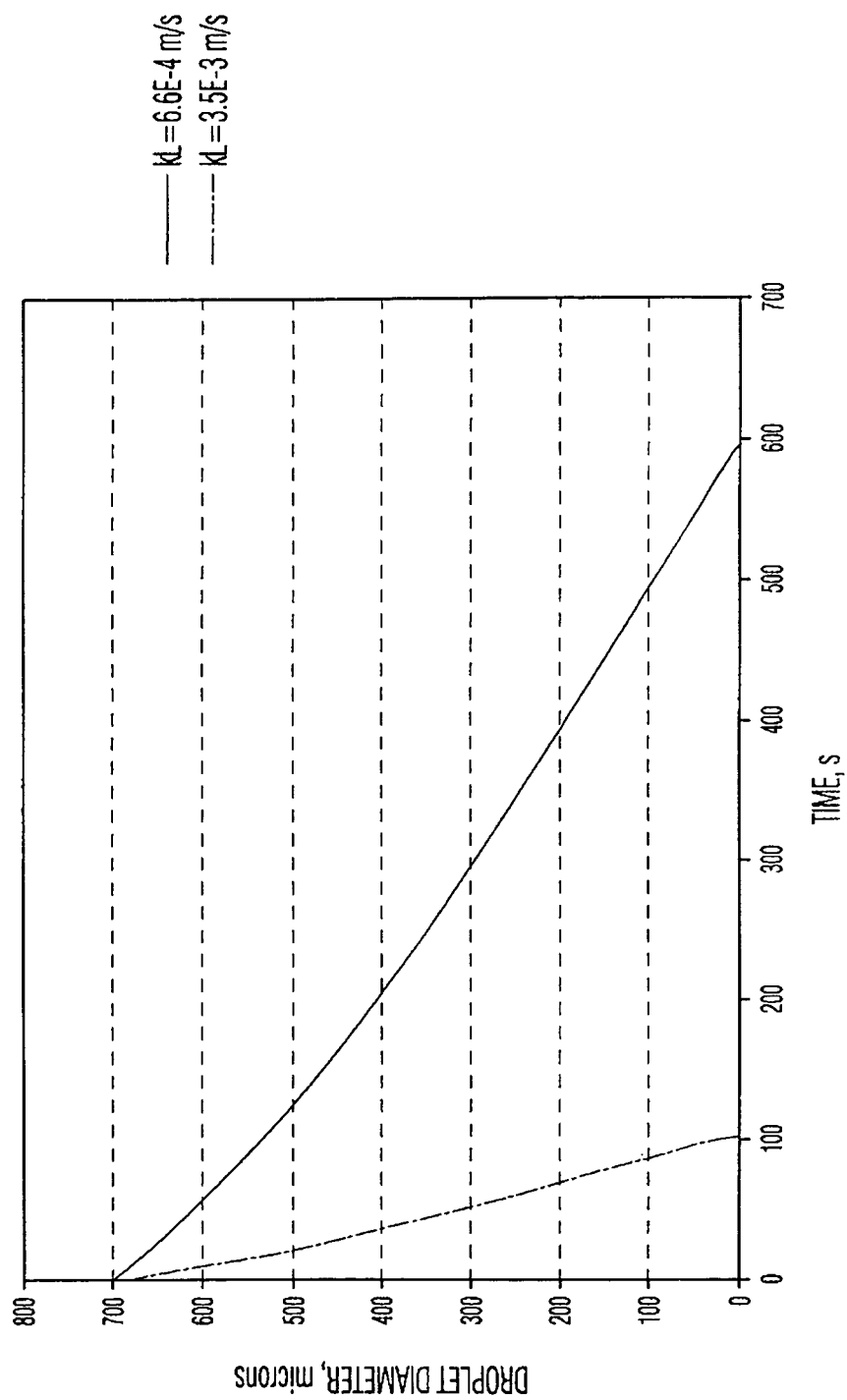
FIG. 8 illustrates results for Droplet diameter versus time for droplets starting at $d_{max}$ value of 700 μm.

FIGS. 5 and 8 are next used to determine a full solubilization time for the biggest surfactant droplets. From these Figures, it can be estimated that about 500 seconds are required for full solubilization of the surfactant droplets, representing 5300 feet of pipe. At 500 seconds, the 700 μm surfactant droplets have shrunk to 1/7 of original diameter so have just (1/7)$^3$=0.003 of their original mass. The half-life of these droplets is just under 90 seconds, representing 920 feet of piping. However it must be recognized that the surfactant droplets starting with diameter $d_{max}$ do not represent a large fraction of the total mass. A $d_{32}$ basis represents the total surface area available in the droplet distribution. As shown in FIG. 6, 99% of the total mass of the injected surfactant is solubilized in 300 seconds, or 3200 feet.

So, it has been found that using a low end estimate for $k_L$, generated from extrapolation of data from an analogous species (e.g., Vitamin E) to the surfactant used in the above calculations of the present disclosure, it was found that about 3200 feet of piping length is required to ensure 99% solubilization of the surfactant into the scCO$_2$. At 1500 feet, the undissolved fraction of the surfactant could be as high as 20%. The half-life of the biggest droplets is just under 90 seconds, which is equivalent to about 920 feet of piping.

As appreciated, the above calculations were based on specific conditions for both the scCO$_2$ and the surfactant. It is appreciated that as the physical characteristics of the scCO$_2$ (e.g., density, pressure, temperature, and/or mass flow rate) change so will the Reynolds number (e.g., the amount of turbulence) of the scCO$_2$ and in turn the maximum stable droplet diameter for the prevailing turbulent flow condition of the scCO$_2$. In other words, the maximum stable droplet diameter for a given surfactant is dependent upon the prevailing turbulent flow condition of the scCO$_2$.

As discussed herein, these maximum stable droplet diameters, however, may not be sufficiently small to ensure that the surfactant is solubilized into the scCO$_2$ before the end of the piping. As discussed herein, the injector(s) of the present disclosure can help to ensure that droplet diameter of the surfactant are less than the maximum stable droplet diameter for the prevailing turbulent flow condition of the scCO$_2$. The injectors used with the system of the present disclosure may allow for the droplets of the surfactant to be rapidly formed in and distributed throughout a stream of scCO$_2$ to better ensure that the surfactant is completely solubilized into the scCO$_2$ prior to being delivered into an oil containing reservoir for enhanced oil recovery.

It is to be understood that the above description has been made in an illustrative fashion, and not a restrictive one. Although specific embodiments have been illustrated and described herein, those of ordinary skill in the art will appreciate that other component arrangements can be substituted for the specific embodiments shown. The claims are intended to cover such adaptations or variations of various embodiments of the disclosure, except to the extent limited by the prior art.

In the foregoing Detailed Description, various features are grouped together in exemplary embodiments for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A process for solubilizing a surfactant in supercritical carbon dioxide, the process comprising:
   providing a turbulent flow in piping of the supercritical carbon dioxide into which the surfactant solubilizes;
   injecting the surfactant through a port in a tube that extends into the piping containing the turbulent flow of the supercritical carbon dioxide through the port in a direction that cuts across a longitudinal flow direction of the supercritical carbon dioxide to achieve a Jet Mixing Number of 0.01 to 1.0, wherein the Jet Mixing Number is equal to a product of a quotient of a jet velocity of the surfactant in the port and a velocity of the supercritical carbon dioxide in the piping and a quotient of a diameter of the port and a radius of the piping; and
   producing a droplet diameter for the surfactant of less than a maximum stable droplet diameter calculated for a prevailing turbulent flow condition of the supercritical carbon dioxide.

2. The process of claim 1, further including producing droplet diameters of the surfactant that have a residence time in the supercritical carbon dioxide of less than 700 seconds.

3. The process of claim 1, where injecting the surfactant is at a predetermined volumetric value relative a volumetric flow rate of the supercritical carbon dioxide.

4. The process of claim 1, where providing turbulent flow includes providing a fitting in the piping conveying the supercritical carbon dioxide and where injecting the surfactant into the turbulent flow of the supercritical carbon dioxide is adjacent the fitting.

5. The process of claim 1, where providing turbulent flow includes providing a hollow conical insert in the piping conveying the supercritical carbon dioxide to increase a local velocity of the supercritical carbon dioxide near the injected surfactant.

6. A system for solubilizing a surfactant in supercritical carbon dioxide, the system comprising:
the supercritical carbon dioxide in piping;
a pump to provide a turbulent flow of the supercritical carbon dioxide through at least a portion of the piping; and
an injector associated with the piping, the injector conveying the surfactant through surfaces defining a port in the injector, where the injector is a tube that extends into the piping containing the supercritical carbon dioxide and where the surfactant is injected into the turbulent flow of the supercritical carbon dioxide through the port in a direction that cuts across a longitudinal flow direction of the supercritical carbon dioxide so as to achieve a Jet Mixing Number of 0.01 to 1.0, wherein the Jet Mixing Number is equal to a product of a quotient of a jet velocity of the surfactant in the port and a velocity of the supercritical carbon dioxide in the piping and a quotient of a diameter of the port and a radius of the piping to produce a droplet diameter for the surfactant of less than a maximum stable droplet diameter calculated for a prevailing turbulent flow condition of the supercritical carbon dioxide.

7. The system of claim 6, where the piping includes fittings and the injector associated with the piping is associated with the fittings of the piping.

8. The system of claim 6, where the piping includes a hollow conical insert in the piping to increase a local velocity of the supercritical carbon dioxide near the port.

9. The system of claim 6, where the port of the tube is in a position so the surfactant is injected into the supercritical carbon dioxide at an angle that is perpendicular to a longitudinal flow direction of the turbulent flow.

10. The system of claim 6, where the port in the injector allows the surfactant injected into the turbulent flow of the supercritical carbon dioxide to achieve a droplet diameter for the surfactant of less than a maximum stable droplet diameter calculated for a prevailing turbulent flow condition of the supercritical carbon dioxide.

11. The system of claim 10, where the droplet diameter of the surfactant has a residence time in the supercritical carbon dioxide of less than 700 seconds.

12. The system of claim 6, where the port in the injector is positioned approximately at a radial center of the piping.

13. The system of claim 6, where the injector injects the surfactant at a predetermined volumetric value relative a volumetric flow rate of the supercritical carbon dioxide.

* * * * *